US008291371B2

(12) United States Patent
Beaton et al.

(10) Patent No.: US 8,291,371 B2
(45) Date of Patent: Oct. 16, 2012

(54) SELF-SERVICE CREATION AND DEPLOYMENT OF A PATTERN SOLUTION

(75) Inventors: Murray J. Beaton, Ajax (CA); Christina Lau, Scarborough (CA); Billy R. Rowe, Jr., Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1727 days.

(21) Appl. No.: 11/551,935

(22) Filed: Oct. 23, 2006

(65) Prior Publication Data

US 2008/0097740 A1 Apr. 24, 2008

(51) Int. Cl.
*G06F 9/44* (2006.01)
(52) U.S. Cl. ........ 717/100; 717/101; 717/102; 717/103; 717/104; 717/105; 717/168
(58) Field of Classification Search .......... None
See application file for complete search history.

(56) References Cited

U.S. PATENT DOCUMENTS

| | | | |
|---|---|---|---|
| 6,427,230 B1 * | 7/2002 | Goiffon et al. | 717/108 |
| 6,701,381 B2 * | 3/2004 | Hearne et al. | 719/313 |
| 7,693,731 B1 * | 4/2010 | Weber et al. | 705/4 |
| 2002/0108099 A1 * | 8/2002 | Paclat | 717/102 |
| 2006/0074824 A1 * | 4/2006 | Li | 706/20 |
| 2006/0206856 A1 * | 9/2006 | Breeden et al. | 717/101 |

OTHER PUBLICATIONS

Zyl, Jay van. An Approach to Assemble Software Products using a Product Line Approach. [online] (Sep. 23, 2003). Systemic Logic (Pty) Ltd, pp. 1-7. Retrieved From the Internet <http://citeseerx.ist.psu.edu/viewdoc/summary?doi=10.1.1.107.2618>.*
Gamma et al. Design Patterns: Elements of Reusable Object Oriented Software. [online] (1995). Addison-Wesley, pp. 1-38. Retrieved From the Internet <http://www.cs.up.ac.za/cs/aboake/sws780/references/patternstoarchitecture/Gamma-DesignPatternsIntro.pdf>.*
Pree, Wolfgang. Meta Patterns—A Means For Capturing the Essentials of Reusable Object-Oriented Design. [online] (1994). C. Doppler Laboratory for Software Engineering, pp. 1-13. Retrieved From the Internet <http://citeseerx.ist.psu.edu/viewdoc/download?doi=10.1.1.92.1202&rep=rep1&type=pdf>.*
OMG. Reusable Asset Specification. [online] (Jun. 6, 2004). Object Management Group, Inc., pp. 1-108. Retrieved From the Internet <http://www.omg.org/cgi-bin/doc?ptc/2004-06-06>.*

* cited by examiner

*Primary Examiner* — Emerson Puente
*Assistant Examiner* — Jonathan R Labud
(74) *Attorney, Agent, or Firm* — Steven M. Greenberg, Esq.; Carey, Rodriguez, Greenberg & O'Keefe

(57) ABSTRACT

Embodiments of the present invention address deficiencies of the art in respect to pattern design and provide a novel and non-obvious method, system and computer program product for self-service creation and deployment of a pattern. In an embodiment of the invention, a method for creating a self-service reusable pattern can be provided. The method can include implementing an arrangement of re-usable assets into a set of self-service application components, extending at least one of self-service application components, and packaging the components for deployment in a target environment. The method further can include determining a target deployment environment and modeling the target environment to receive the deployment of the components. Thereafter, the packaged components can be deployed to a portal server or to a portal test environment.

10 Claims, 4 Drawing Sheets

SELF-SERVICE CREATION AND DEPLOYMENT OF A PATTERN SOLUTION

CROSS-REFERENCE TO RELATED APPLICATIONS

This patent application claims the benefit under 35 U.S.C. §119(e) of presently pending U.S. patent application Ser. No. 11/027,067, entitled PATTERN SOLUTIONS, filed on Dec. 30, 2004, which claims the benefit of U.S. Provisional Patent Application 60/622,271, entitled MODEL DRIVEN DEVELOPMENT PRODUCTS, filed on Oct. 25, 2004, the entire teachings of which are incorporated herein by reference.

BACKGROUND OF THE INVENTION

1. Field of the Invention

The present invention relates to the field of pattern creation and more particularly to pattern solution creation and reuse.

2. Description of the Related Art

Patterns describe a problem and a general solution for the problem in a particular context. Patterns have been formalized by some as a three-part rule which expresses a relation between a certain context, a problem and a solution. Patterns are useful in addressing recurring design problem/solution pairs. Pattern development has its history in the study of architecture where Christopher Alexander, author of Alexander et al., *A Pattern Language: Towns, Buildings, Construction*, Center for Environmental Structure Series (1977), describes patterns for solving recurring problems in urban architectural design.

In the computing field, patterns have been used to aid the software development process. The seminal text, Erich Gamma, Richard Helm, Ralph Johnson and John Vlissides, *Design Patterns—Elements of Reusable Object-Oriented Software*, Addison-Welsey (1996) defines creation patterns, structural patterns and behavioral patterns for software development. Additionally, the well-known text, Deepak Alur, John Crupi and Dan Malks, *Core J2EE Patterns—Best Practices and Design Strategies*, Sun Microsystems Press (2001) describes patterns useful in the Java programming environment.

Patterns have been collected into catalogs. Patterns have also been combined to form pattern languages that define a set of reserved words (a language) for expressing a solution to a problem. Pattern languages in the computer field focus mainly on software design and software development. Pattern usage for other aspects of the software life cycle, including application infrastructure, application deployment, and business process integration, have largely been ignored. In all circumstances, pattern languages lack organization, ordering and substitution of combined patterns.

BRIEF SUMMARY OF THE INVENTION

Embodiments of the present invention address deficiencies of the art in respect to pattern design and provide a novel and non-obvious method, system and computer program product for self-service creation and deployment of a pattern. In an embodiment of the invention, a method for creating a self-service reusable pattern can be provided. The method can include implementing an arrangement of re-usable assets into a set of self-service application components, extending at least one of self-service application components, and packaging the components for deployment in a target environment. The method further can include determining a target deployment environment and modeling the target environment to receive the deployment of the components. Thereafter, the packaged components can be deployed to a portal server or to a portal test environment.

In one aspect of the embodiment, implementing an arrangement of re-usable assets into a set of self-service application components can include, for each of the re-usable assets, applying a corresponding transformation to produce a re-usable asset implementation. In another aspect of the embodiment, implementing an arrangement of re-usable assets into a set of self-service application components can include implementing an arrangement of patterns into a set of self-service application components. As such, implementing an arrangement of patterns into a set of self-service application components can include, for each of the patterns, applying a corresponding transformation to produce a pattern implementation.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for pattern variability in a solutions template. In accordance with an embodiment of the present invention, a method for creating a self-service reusable pattern can include implementing an arrangement of re-usable assets into a set of self-service application components, extending at least one of self-service application components, and packaging the components for deployment in a target environment. The method further can include determining a target deployment environment and modeling the target environment to receive the deployment of the components. Thereafter, the packaged components can be deployed to a portal server or to a portal test environment.

Figure 1:
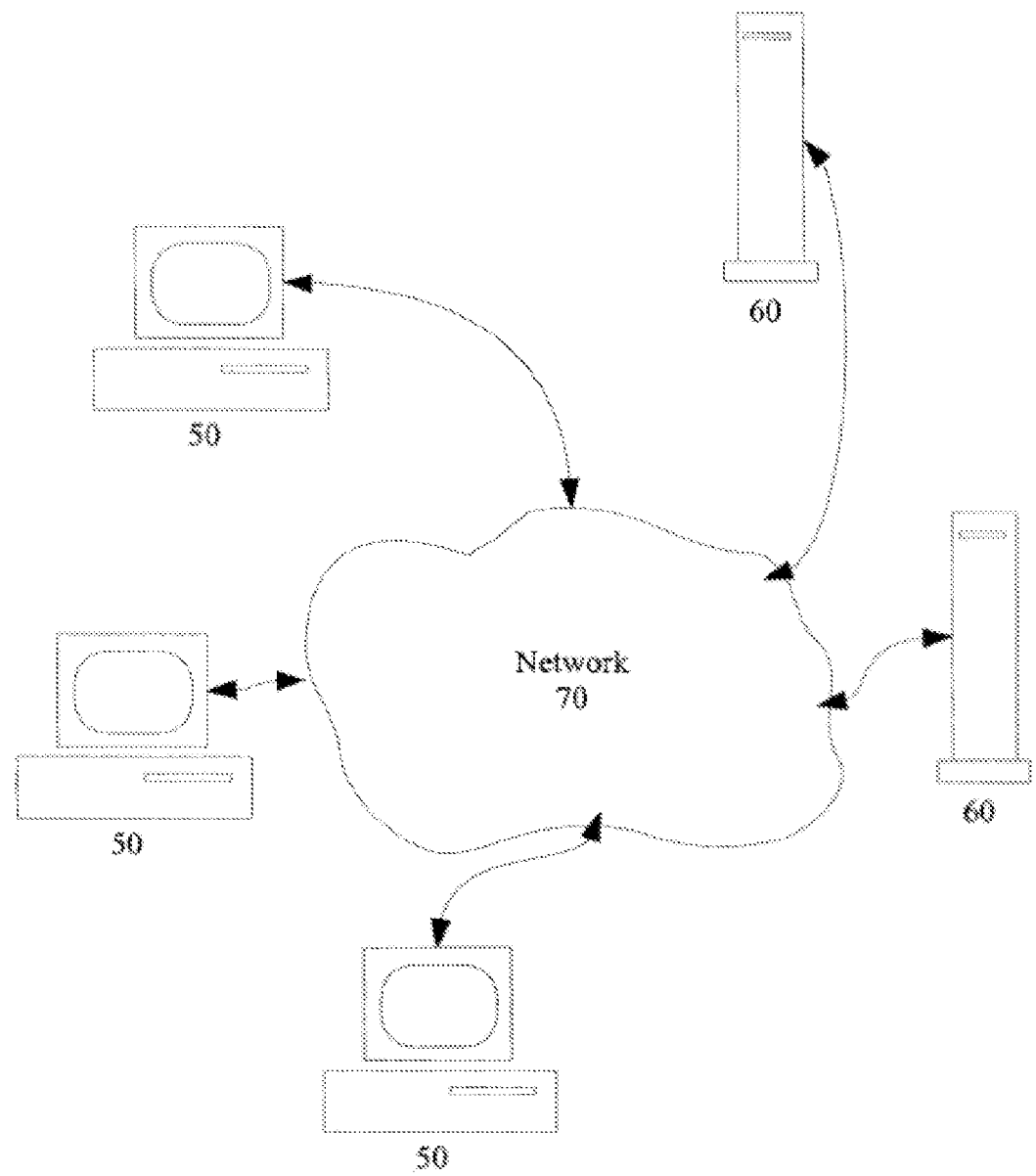
FIG. 1 is a pictorial illustration of a computer system which has been configured in accordance with the present invention.

In illustration of an embodiment of the invention, FIG. 1 shows a client computer 50 and server computer 60 providing processing, storage, and input/output (I/O) devices for creating and implementing a pattern solution. The client computers 50 can also be linked through a communications network 70 to other computing devices, including other client computers 50 and server computers 60. The communications network 70 can be part of the Internet, a worldwide collection of computers, networks and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, creating and implementing a pattern solution can be implemented on a stand-alone computer.

Figure 2:
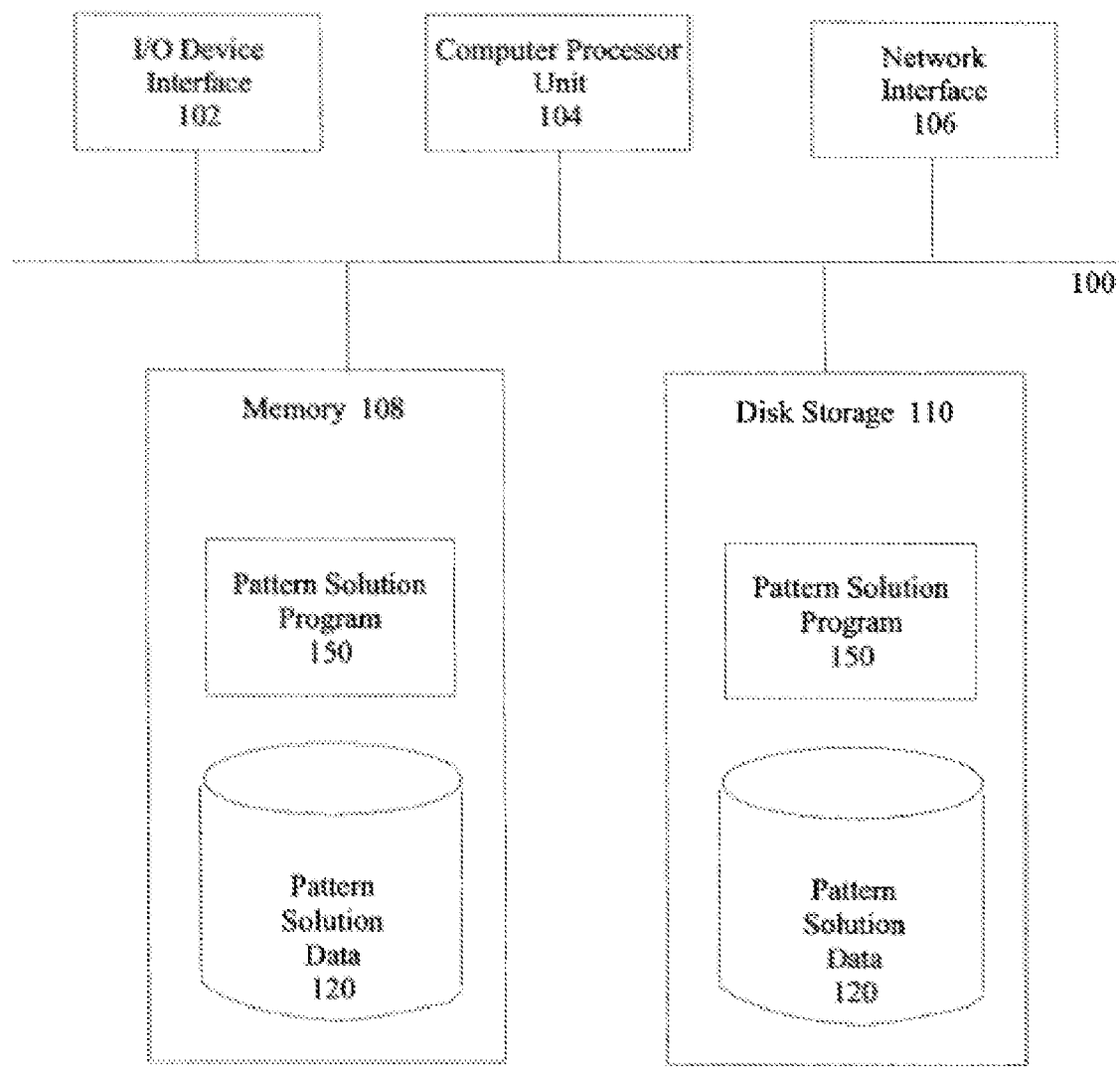
FIG. 2 is a diagram of the internal structure of a computer in the computer system of FIG. 1.

FIG. 2 is a diagram of the internal structure of a computer (50, 60) in the computer system of FIG. 1. Each computer contains a system bus 100, where a bus is a set of hardware lines used for data transfer among the components of a computer (50, 60). A bus 100 is essentially a shared conduit that connects different elements of a computer system (e.g., processor, disk storage, memory, input/output ports, network ports, etc.) that enables the transfer of information between the elements. Attached to system bus 100 is an I/O device interface 102 for connecting various input and output devices (e.g., displays, printers, speakers, etc.) to the computer.

A network interface 106 allows the computer to connect to various other devices attached to a network (e.g., network 70). A memory 108 provides volatile storage for computer software instructions (e.g., Pattern Solutions Program 150) and data (e.g., Pattern Solution Data 120) used to implement an embodiment of the present invention. Disk storage 110 provides non-volatile storage for computer software instructions (e.g., Pattern Solutions Program 150) and data (e.g., Pattern Solution Data 120) used to implement an embodiment of the present invention. A computer processor unit 104 is also attached to the system bus 100 and provides for the execution of computer instructions (e.g., Pattern Solutions Program 150) and data access (e.g., Pattern Solution Data 120), thus allowing the computer to create and implement a pattern solution.

Figure 3:
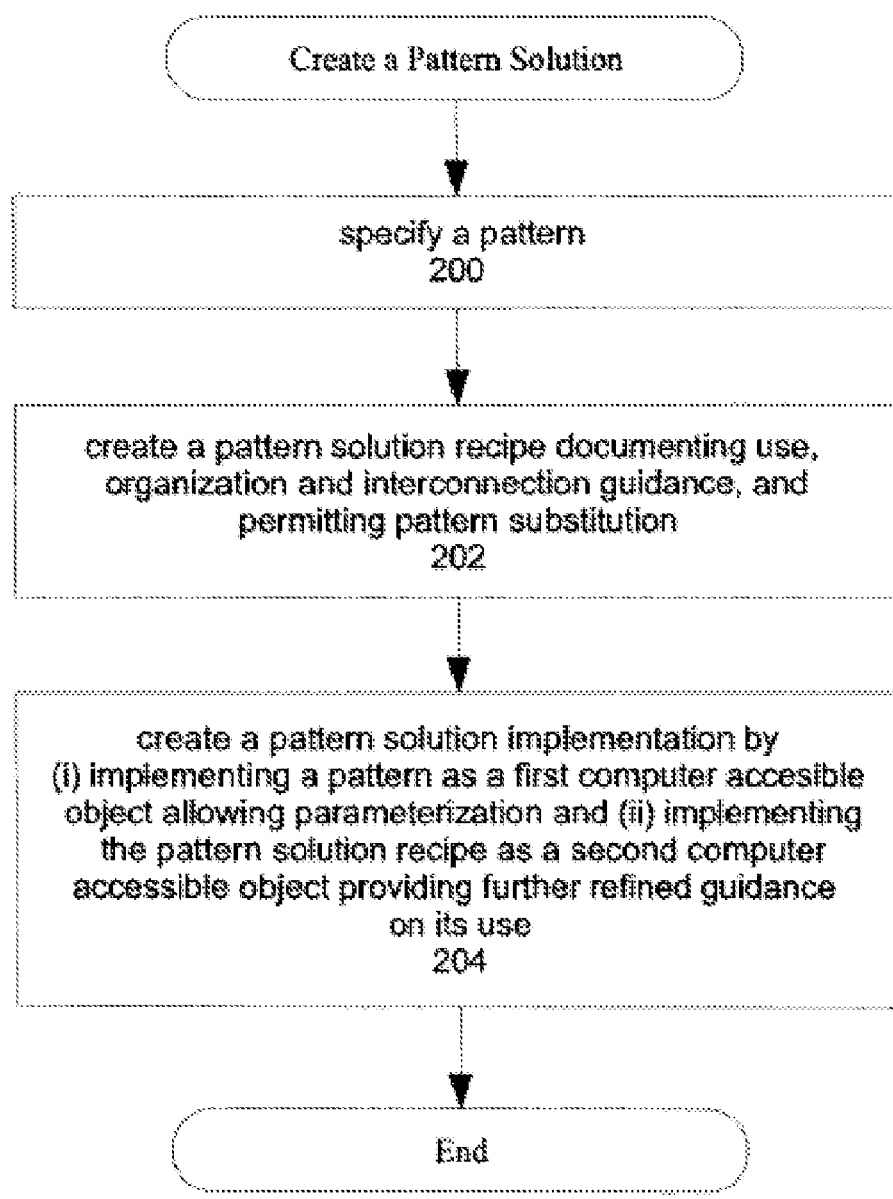
FIG. 3 is a flow chart illustrating a process for creating and implementing a pattern solution.

FIG. 3 is a flow chart illustrating a process for creating and implementing a pattern solution. At step 200 a pattern or multiple patterns can be specified. The pattern(s) can be pre-existing pattern(s) such as the design pattern known in the art as the Abstract Factory creational pattern. A new, previously undefined pattern also can be authored to solve a particular problem. As few as one pattern, or as many patterns as are needed, can become part of the pattern solution being created. At step 202 a pattern solution recipe is created. The pattern solution recipe provides documentation on the use, organization and interconnection of the specified patterns in the pattern solution.

In a preferred embodiment of the present invention, the order in which the specified patterns are applied is part of the use information. The pattern solution recipe can also contain interconnection guidance. In one embodiment the interconnection guidance can help align the outputs of one pattern with the inputs of another pattern. The ability to substitute one (or more) pattern for another (or more) pattern provides flexibility in the design of the pattern solution. Substitution guidance is documented in the pattern solution recipe. Transforming a pattern solution into a pattern solution implementation is performed at step 204 by implementing a pattern as a computer accessible object such that it can be parameterized to affect its use. Additionally, the pattern solution recipe can be implemented as another computer accessible object which provides further refined guidance on the use of the implemented patterns.

Figure 4:
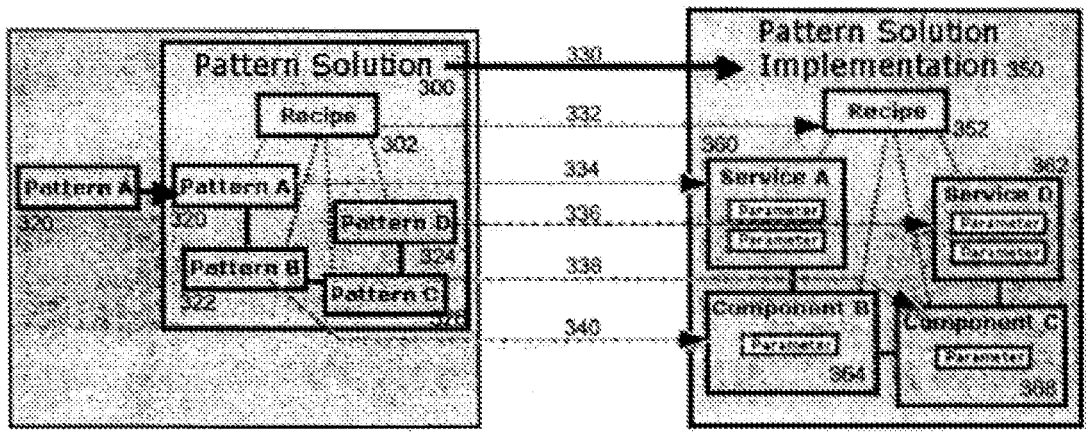
FIG. 4 is pictorial illustration of a pattern solution and its transformation into a pattern solution implementation; and, FIG. 5 is a flow chart illustrating a process for creating and implementing a pattern solution utilizing a self-service template.

FIG. 4 is pictorial illustration of a pattern solution 300 and its transformation (330) into a pattern solution implementation 350. A pattern solution 300 contains a recipe 302 and a series of patterns: pattern A 320, pattern B 322, pattern C 326 and pattern D 324. Pattern A 320 is shown as originating at a different source and being pulled into pattern solution 300. Pattern solutions 300 are very useful in the creation of computer software solutions. There are many software artifacts and software assets (e.g., Service A 360, Component B 364, Component C 368 and Service D 362) which are used to create a software solution.

The present invention pulls software artifacts and assets together in the proper order with the necessary guidance for the user while allowing the artifacts and assets to be swapped in and out of the solution. The software artifacts and assets pulled together are implementations of patterns (e.g., pattern A 320, pattern B 322, pattern C 326 and pattern D 324). Patterns describe solutions to recurring problems for a particular context and pattern solutions (e.g., pattern solution 300) knit many patterns together (i.e., artifacts and assets) using a recipe 302, containing the guidance to use the patterns (302-326) in the proper order.

A pattern solution recipe 302 is transformed into a pattern solution implementation recipe 352 via transformation 332. Pattern are transformed via transformations into an implementation. Transformations (e.g., transformations 330-340) can be text-to-text transformations where further refinement (e.g., "an implementation of this pattern can be in this repository at this website") on the guidance for use of a pattern results (e.g., an XML file). A transformation can also be the implementation of a pattern (e.g., pattern C 326) into a standard programming language (e.g., C, C++, Java) with further transformation (e.g., compliation) into an executable computer object (e.g., component C 368).

Referring to FIG. 4; pattern A 320 is transformed via transformation 334 to service A 360, pattern B 322 is transformed via transformation 340 to component B 364, pattern C 326 is transformed via transformation 338 to component C 368 and pattern D 324 is transformed via transformation 336 to service D 362. Patterns (320-326) and pattern solutions 300 are generally described using text. A pattern solution recipe 302 can also be described using some structured text in terms of required and necessary elements that should be captured (e.g., use, organization and interconnection guidance).

Any of the software artifacts or assets, including the pattern solution implementation recipe 352 can be packaged using the Object Management Group's (OMG) Reusable Asset Specification (RAS). RAS can be extended to describe various types of software artifacts or assets. In one embodiment a RAS document can be instantiated as an XML document. The pattern solution implementation recipe 352 can be created as is a special kind of asset which knits many other assets (e.g., implemented patterns) together.

In a preferred embodiment the invention works by starting with descriptions for each of the relevant patterns (320-326) identified for a particular pattern solution 300. The pattern solution recipe 302 pulls these descriptions together, describing a more coarse-grained solution. The pattern solution recipe 302 describes how the patterns (320-326) connect, when to use them, and in what manner. The pattern solution 300 is transformed (330) into a pattern solution implementation 350. The pattern solution implementation 350 consists of implementations of the relevant patterns (320-326), as services (e.g., service A 360, service D 362), components (e.g., component B 264, component C 368), and so on, producing software artifacts. The pattern solution implementation recipe 352 identifies the location of the pattern implementations (i.e., services, component, etc.). In one preferred embodiment the locations are links/pointers to software repositories (e.g., URLs pointing to RAS repositories). Other information stored in a pattern solution implementation recipe 352 can include a name of the pattern solution and a general description of the solution itself, as well as links/pointers to additional documentation.

The pattern solution implementation recipe 352 can be structured using a RAS profile. The RAS profile is an XML schema document, from which a specific XML document is created, one per solution, to capture the pattern solution implementation recipe 352. A pattern solution implementation recipe 352 further refines, according to some context (e.g., a specific operating platform, known user sophistication, a particular development environment, a particular deployment environment or particular business/domain contexts), the guidance information (e.g., on a particular operating environment with users a certain level of user sophistication a system response time of 2 seconds is acceptable).

Another way of describing a pattern solution implementation recipe 352 is that it binds more constraints to the guidance from the pattern solution recipe 302. One way to view the process of creating and implementing a pattern solution is to examine an exemplary workflow, identifying typical roles of uses at various points. In one embodiment of the present invention the roles of "solution designer," "solution assembler," and "solution implementer" are illustrative. A solution designer creates the pattern solution 300 by pulling together a variety of new and existing patterns (320-326) to solve a problem and creating a pattern solution recipe 302 containing guidance on how to use the patterns (320-326). The solution designer can be viewed as seeing the ultimate solution in the abstract. The solution designer has access to some tooling that helps with the creation, editing and storage of the pattern solution 300. For example, the pattern solution can be stored as an XML formatted file with a file extension of ".ps".

The .ps file containing the pattern solution 300 can be used as input to a solution assembler. The solution assembler assembles a pattern solution implementation by further refining the guidance of the pattern solution recipe 302 and further refining the definition of the patterns (320-326). These further refinements can take the form of location information detailing where an implementation of a particular pattern can be found. Further refinements to the pattern solution implementation recipe 352 can take the form of context specific information based on how/where the solution will be deployed. The solution assembler may also have access to some tooling that helps with the creation, editing and storage of the pattern solution implementation 350.

For example, the pattern solution can be stored as an XML formatted file with a file extension of ".psi". As with the .ps file, the .psi file can be stored in a RAS repository. The .psi file containing the pattern solution implementation can be used as input to a solution implementer. The solution implementer builds the actual solution. In the case of a computer system solution this may be an executable computer program or system of programs (e.g., a .jar file).

A fundamental element to RAS is the fact that you can identify the context for which the asset can be (re)used. Context can be development context (e.g., J2EE), deployment context (e.g., WebSphere), domain context (e.g., financial services), and so on. The notion of context directly impacts the organization of the recipes (e.g., pattern solution 302 or pattern solution recipe 352). If you are going to apply a recipe in a certain context, it can/does directly affect the recipe in terms of steps that may be skipped, ingredients/assets that may be used or avoided, and so on. For this reason, the notion of substituting ingredients/assets in a recipe is important to the invention, because one cannot always plan on the context within which the recipe can be used.

Pattern solutions can be used to solve non-computer related problems as well. An illustrative, non-technical, example follows. Imagine the problem space to be the planning of a dinner party. The problem statement identifies a need for a delicious cake for dessert at the dinner party. A solution designer (party planner) can create a pattern solution comprising patterns for a 3-tier yellow cake with chocolate frosting and white candy decorations—the "cake pattern solution." The patterns can be based on existing patterns for desserts (e.g., ways of making/acquiring 3-tier yellow cake and chocolate frosting may be readily available), but a new pattern for the solution to the white candy decoration may have to be created from scratch.

A solution assembler (chef) can take the cake pattern solution and implement it by transforming the patterns specified by the solution designer into more refined instruction (i.e., a conventional food recipe). The conventional food recipe (pattern solution implementation) may contain a list of ingredients and instructions on how and when to combine them as well was what to do with them once combine (e.g., bake them). Additional context guidance may be provided (e.g., a cake baked at high altitude may require more baking time). A solution implementer (line cook) can take the pattern solution implementation (conventional food recipe) and build (bake) it. Thus it can be seen that creating and implementing pattern solutions is applicable to many problems.

Figure 5:
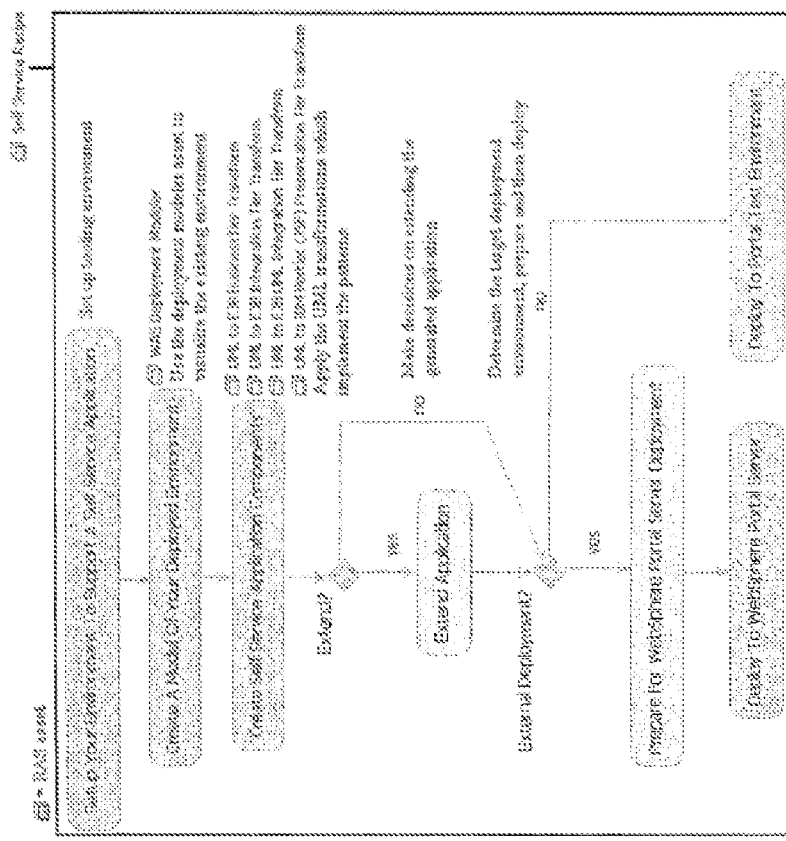

Referring to FIG. 5, a self-service solution template can be provided. The self-service solution template can be created using tools which package key elements of the solution as reusable assets. This provides some modularity and division of labor when applying the solution. The solution is built using a flow of activities shown in FIG. 5. At various steps in the recipe, reusable assets are used to provide mini-solutions in the overall solution. The reusable assets are retrieved from a repository. The initial asset, in this case the Self Service Recipe, serves as the entry point to the solution. This recipe asset provides guidance for applying the solution, and includes pointers to the reusable assets that should be used.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for creating and implementing a pattern solution, the method comprising:
   specifying at least one pattern for the pattern solution, the pattern being selected from pre-existing patterns or being newly authored;
   creating a pattern solution recipe, the pattern solution recipe providing documentation on use, organization, interconnection, and substitution of the at least one pattern in the pattern solution;
   transforming the pattern solution into a pattern solution implementation by:
      transforming each pattern in the pattern solution into a corresponding pattern implementation, the pattern implementation being a computer accessible object allowing parameterization; and
      transforming the pattern solution recipe into a pattern solution implementation recipe, the pattern solution implementation recipe being a computer accessible object providing further refined guidance for use of the pattern implementation based on the pattern solution recipe; and deploying the pattern solution implementation.

2. The method of claim 1, further comprising:
   determining a target deployment environment; and,
   modeling the target environment to receive the deployment of the pattern solution implementation.

3. The method of claim 1, wherein the pattern solution implementation includes a set of self-service application components.

4. The method of claim 1, the pattern solution implementation is packaged and deployed to a portal server.

5. The method of claim 1, the pattern solution implementation is packaged and deployed to a portal test environment.

6. A computer program product comprising a non-transitory computer usable medium having computer usable program code for creating and implementing a pattern solution, the computer program product including:
   computer usable program code for specifying at least one pattern for the pattern solution, the pattern being selected from pre-existing patterns or being newly authored;
   computer usable program code for creating a pattern solution recipe, the pattern solution recipe providing documentation on use, organization, interconnection, and substitution of the at least one pattern in the pattern solution;
   computer usable program code for transforming the pattern solution into a pattern solution implementation, including:
      computer usable program code for transforming each pattern in the pattern solution into a corresponding pattern implementation, the pattern implementation being a computer accessible object allowing parameterization; and
      computer usable program code for transforming the pattern solution recipe into a pattern solution implementation recipe, the pattern solution implementation recipe being a computer accessible object providing further refined guidance for use of the pattern implementation based on the pattern solution recipe; and
   computer usable program code for deploying the pattern solution implementation.

7. The computer program product of claim 6, further comprising:
   computer usable program code for determining a target deployment environment; and,
   computer usable program code for modeling the target environment to receive the deployment of the pattern solution implementation.

8. The computer program product of claim 6, wherein the pattern solution implementation includes a set of self-service application components.

9. The computer program product of claim 6, wherein the pattern solution implementation is packaged and deployed to a portal server r.

10. The computer program product of claim 6, wherein the pattern solution implementation is packaged and deployed to a portal test environment.

* * * * *